July 26, 1955  G. M. UREY ET AL  2,714,141
SHOCK AND VIBRATION RESISTANT SOLENOID RELAY
Filed Dec. 8, 1952  2 Sheets-Sheet 1

CHARLES H. PORCH
GEORGE M. UREY
DONALD R. JARRETT
WINFORD M. CRAWFORD
INVENTORS

BY Hazard & Miller

ATTORNEYS

CHARLES H. PORCH
GEORGE M. UREY
DONALD R. JARRETT
WINFORD M. CRAWFORD
INVENTORS

BY Hazard & Miller

ATTORNEYS

United States Patent Office 2,714,141
Patented July 26, 1955

2,714,141

SHOCK AND VIBRATION RESISTANT SOLENOID RELAY

George M. Urey, Charles H. Porch, Donald R. Jarrett, and Winford M. Crawford, Los Angeles, Calif., assignors to Deltronic Corporation, Los Angeles, Calif., a corporation of California Application December 8, 1952, Serial No. 324,770

6 Claims. (Cl. 200—87)

This invention relates to electrical solenoid type relays that are resistant to shock and vibration.

There is now a demand for electrical relays which will not trip or operate when subjected to variable vibrations or severe shocks. According to United States Military Specifications MIL-R-5757, 5757A, and 5757B, such relays must be capable of withstanding a vibration consisting of a simple harmonic motion of .03 inch (.06 inch maximum total excursion) through a frequency varied uniformly from ten to fifty-five cycles per second without closing normally open contacts of the relay with no voltage across the operating coil nor shall it open the contacts with the rated coil voltage across the operating coil. In addition to meeting this requirement the relay must be capable of withstanding severe shocks or rapid accelerations equivalent to from 30 to 50 gravity units for 10 milliseconds. Resistance to both vibration and shock or acceleration shall be true in each of three mutually perpendicular planes.

Many electrical relays heretofore designed have been designed for use on either stationary structures or on moving structures which move and are accelerated or decelerated rather slowly. Consequently such relays are rarely if ever capable of meeting the severe requirements of resistance to vibration and shock or acceleration. Some relays heretofore designed may be capable of withstanding vibration and/or shock in one or two of the three mutually perpendicular planes but in the usual situation the average relay will fail when subjected to vibration and/or shock in three mutually perpendicular planes. The mass or inherent resonance of the armature of the relay frequently causes the relay to fail when it is either vibrated or accelerated or decelerated in the direction in which it is actuated by the operating coil.

It is a primary object of the present invention to provide an improved electrical relay of this type capable of continuing to function properly when subject to vibrations having at least .03 inch in amplitude in each of three mutually perpendicular planes and which vibration may have a variable frequency of at least from ten to five hundred cycles per second. This relay is also to meet the requirement of continuing to function properly even though subjected to acceleration or deceleration in each of the three mutually perpendicular planes equivalent to from 30 to 50 gravity units in ten milliseconds.

More specifically, an object of the invention is to provide an electrical relay having an armature actuated by a solenoid wherein the armature is designed to have a relatively low mass and which is suspended at least in part by a novel spring which urges the armature into a normal position. This spring is so designed that its resonance is at a frequency so remote from the frequency of ten to five hundred cycles per second that for all intents and purposes the spring may be regarded as non-resonant. In this manner, even though the relay is subjected to a variable frequency of some ten to five hundred cycles per second in the direction in which it functions, the spring will in no way contribute to inducing a vibration in the armature which would cause normally closed contacts of the relay to open, or normally open contacts of the relay to close, as a result of the vibration. The spring due to its non-resonant nature, resists such tendencies to vibrate or resonate.

Another object of the invention is to provide a relay having the above mentioned characteristics wherein the contactor of the relay is provided with a snap-over spring which, in the event that the contacts are normally open, will cause the contactor to remain in that position despite vibration or acceleration or deceleration that might tend to close them. Once that the contactor has been shifted over center the over-center spring tends to retain the contactor in its shifted position until conditions are such as to cause the armature to return the contactor to its normal position.

Still a further object of the invention is to provide a novel solenoid construction wherein provision is made for conducting the magnetic flux generated by the operating coil in such a manner as to cause the armature to be firmly and positively actuated when the operating coil is energized, thus enabling the mass of the armature to be kept at a minimum.

With the foregoing and other objects in view, which will be made manifest in the following detailed description and specifically pointed out in the appended claims, reference is had to the accompanying drawings for an illustrative embodiment of the invention, wherein:

Fig. 3 is a partial view similar to Fig. 1 but illustrating the relay in its energized or actuated position;

Figure 1:
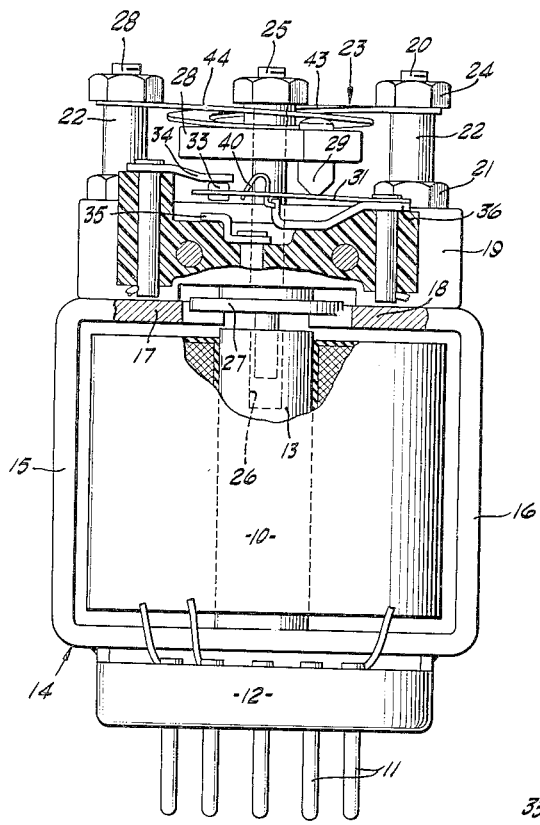
Figure 1 is a view in side elevation, parts being broken away and shown in vertical section, illustrating one form of relay embodying the present invention.
Figure 4:
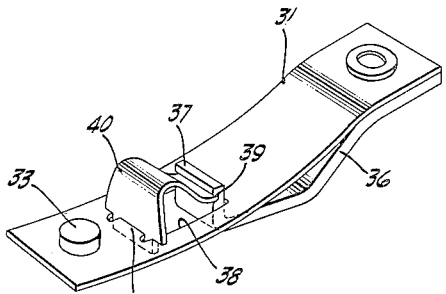
Fig. 4 is a perspective view of one of the contactors forming a part of the improved relay.

Referring to the accompanying drawings wherein similar reference characters designate similar parts throughout, 10 indicates a solenoid or operating winding the ends of which are connected to two of the contact prongs 11 that project from the base 12 on which the solenoid or winding 10 is mounted. The prongs 11 are adapted to be inserted in a suitable socket or receptacle electrically connected so as to receive current from a suitable source of supply for the purpose of energizing the winding 10 and also electrically connected in a circuit which contacts of the relay are to control. The winding 10 has a central or axial core 13 of magnetizable material and, in the preferred form of construction, a yoke generally indicated at 14 is connected at its center to the lower end of the core 13. This yoke is also formed of magnetizable material and provides side arms 15 and 16 which extend along the sides of the winding 10 and terminate in pole faces 17 and 18 disposed adjacent but axially spaced from the upper end of the core 13. This construction, while not absolutely necessary to the present invention, is highly preferred in that the core 13 together with the yoke 14 provide two paths of high permeability for the magnetic flux generated by the winding 10 when this winding is energized. Thus, if it be assumed that the upper end of the core 13 is a south pole, the pole faces 17 and 18 will both be north poles and will be disposed close to the south pole at the upper end of the core. While there is an air gap between the pole faces and the upper end of the core the magnetic flux extending across this air gap will be of a relatively concentrated nature.

On the top of the winding 10 there is mounted a section of insulation 19. This section may be retained in place by means of studs 20 extending upwardly from the pole faces 17 and 18 and retained thereagainst by means of nuts 21. Sleeves or bushings 22 are mounted on the studs and provide at their upper ends spring seats for the ends of a spring 23 retained on the studs such as by nuts 24. The spring 23 serves to yieldably support for axial movement a stem 25 which extends downwardly through the insulation 19 and has its lower end slidably received within an axial recess 26 in the top of the core 13. An armature 27 of magnetizable material is rigidly mounted on the stem and occupies a normal position as depicted in Fig. 1 wherein it is disposed between the pole faces 17 and 18 and close to but nevertheless spaced from the upper end of the core 13. When the winding 10 is energized, however, to induce magnetism in the core 13 and the pole faces 17 and 18, the armature 27 will have a magnetism induced therein and will be caused to assume a position against the end of the core as depicted in Fig. 3. This action is permitted by the flexing of the spring 23 in an axial direction. Conversely, if the circuit through the winding 10 is broken, the armature 27 will no longer be attracted into the position shown in Fig. 3 and the spring 23 is effective to return it to its normal position shown in Fig. 1.

On the stem 25 there is a cross bar 28 which has at its ends pins 29 and 30 which engage contactors 31 and 32. Each contactor has contacts 33 thereon engageable with contacts 34 and 35. The contacts 34 and 35 and the contactor 31 are electrically connected to other prongs 11 than those heretofore mentioned. The contactors 31 are formed of relatively thin strips of sheet metal so as to be readily flexible. Each contactor is rigidly attached to an associated stiff support 36 that is arranged beneath the contactor and which has an end 37 extending upwardly through an aperture 38 therein. The end 37 is grooved as at 39 to provide a spring seat for an arched snap-over center spring 40. The other end of the arched snap-over spring 40 is of reduced width and extends downwardly through the aperture 38. Each arched spring 40 tends to expand between the end 37 of the stiff supporting member 36 and the end 41 of the aperture 38 in the contactor. The pressure exerted thereby is to cause the contactor to tend to remain in either of its extreme positions. Thus, as depicted in Fig. 1, when the contactor 31 is in its uppermost position wherein its contact point 33 engages the contact 34, the pressure exerted by the arched spring 40 causes the contactor to tend to remain in this position. However when the solenoid 10 has been energized to shift the armature 27 and consequently the contactor 31 into the position shown in Fig. 3, the pressure of the arch spring 40 is such as to cause the contactor to tend to remain in this position. The arch spring 40 associated with each contactor may, therefore, be regarded as a snap-over centertype of spring in that it will cause the contactor to assume either of two extreme positions and once that the contactor is in one extreme position it will tend to retain the contactor in that position.

Figure 2:
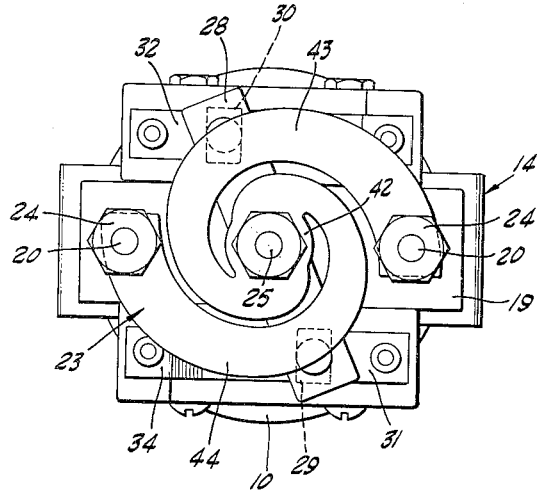
Fig. 2 is a top plan view of the same.

An important feature of the present construction resides in the type of spring 23 that is employed. This spring is so constructed that it may be regarded as a non-resonant spring or, if it has a resonance, the frequency at which the spring resonates is so remote from the frequency to which the relay is apt to be subjected that for all intents and purposes the spring may be regarded as a non-resonant spring with respect thereto. This spring is preferably stamped from sheet metal having uniform thickness and uniform resiliency. It consists of a central hub 42 through which the stem 25 extends. From this hub on diametrically opposite sides thereof there extends two spiral arms 43 and 44 which gradually increase in width from the hub to their outer ends where they are attached respectively to the studs 20. As illustrated somewhat exaggeratedly in Fig. 2, these arms have the widths at their inner ends unequal, that is, as depicted, the width at the inner end of the arm 43 is slightly greater than the width of the arm 44. The difference in widths, however, need not be great. Only a few thousandths of an inch difference in width is adequate. Each arm, however, increases in width from the hub outwardly in accordance with an exponential curve. In other words, each arm has an exponential taper. This exponential taper, coupled with the unequaled width of each arm of the spring, causes the spring as a whole to have a non-resonant characteristic or a resonance at a frequency so remote from the frequency to which the relay is vibrated that the spring may be regarded as non-resonant. By reason of the above described construction of the spring 23 the resonance of one arm is different from that of the other. Furthermore, due to the exponential taper each increment along the length of each arm has a different resonance with respect to the resonance of adjoining increments. Consequently, if the relay is subjected to vibration which would tend to set up resonance in one arm or in a specified increment thereof, this is neutralized or nullified by the different resonance of the other arm or by the differing resonances of increments along the length of the two arms. The overall result is that the spring 23 and its attached structure has a resonance at such a high frequency as compared with the frequency to which the relay is apt to be subjected that in effect the spring and its associated structure may be regarded as non-resonant under the working conditions of vibration to which the relay will be subjected while in use.

The operation of the above described relay is substantially as follows. When the solenoid 10 is energized the armature 27 is attracted from the position shown in Fig. 1 into the position shown in Fig. 3. Downward movement of the stem 25 causes the pins 29 and 30 to depress the contactors 31 and 32, thus breaking the circuit between the contactor and the upper contacts 34 and making the circuit between the contactor and the lower contacts 35. It will be appreciated that the particular arrangement of contacts 34 and 35 may be varied considerably to meet various requirements. That is, the relay may be in the form of a "make" relay, or a "break" relay, a "break-make" relay as depicted, a "make before break" relay, or a "break-make before break" relay. In so far as the present invention is concerned, the particular arrangement of contacts is immaterial. However, when a contactor such as 31 is shifted from one position shown in Fig. 1 to the position shown in Fig. 3, or vice versa, the arch spring 40 causes the contactor to snap over center and to tend to remain in its set position. When the solenoid 10 is deenergized the spring 23 tends to return the stem into the position shown in Fig. 1 and when the pressure exerted by the pins 29 on the contactors is completely relieved, the spring of the contactors is sufficient to overcome the effect of the springs 40 and thus accomplish a return. With the parts as thus constructed, as illustrated in Figs. 1 and 3, it will be appreciated that, if the relay is vibrated from side to side or forwardly and backwardly, the fit between the lower end of the stem 25 and the core 13 will prevent vibration of one end of the stem and the armature in either of these directions. The other end of the stem is similarly held or restrained from vibrating in either of these directions by the characteristic of the sheet metal spring 23. If the relay is vibrated in an up and down direction, movement of the stem and armature is resisted by the action of spring 23 when the coil is not energized and by the magnetic pull of the pole pieces when the coil is energized. However, the lack of resonance of the spring 23 prevents this spring from assisting the stem and armature in vibrating relative to the remaining structure of the relay, and resists such tendencies. The action of the arched springs 40 also resists vibration of the contactors 31 and 32 relatively to their contacts 34 and 35. Consequently when the relay is subjected to vibration, regardless of the plane of vibration, there is no tendency of the relay to malfunction or open or close contacts, when they are not intended to be opened or closed. In a similar manner if the relay is rapidly accelerated or decelerated due to the relatively small mass of the stem 25 and the armature 27 there is little tendency for the relay to malfunction. Tests of a relay construction as depicted in Figs. 1 to 4, inclusive, have demonstrated that a relay so constructed was capable of functioning properly even though subjected to a change of frequency of from ten to five hundred cycles per second in each of three mutually perpendicular planes. Also the relay has been capable of being accelerated or decelerated at a rate equivalent to 50 gravity units for eleven milliseconds without malfunctioning.

Figure 5:
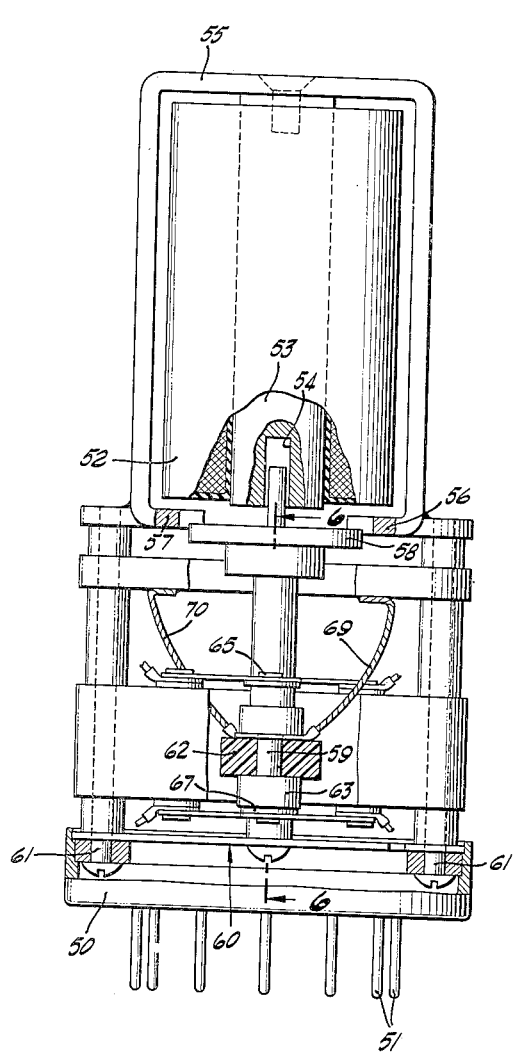
Fig. 5 is a view in side elevation, parts being broken away and shown in vertical section, illustrating an alternative form of construction.
Figure 6:
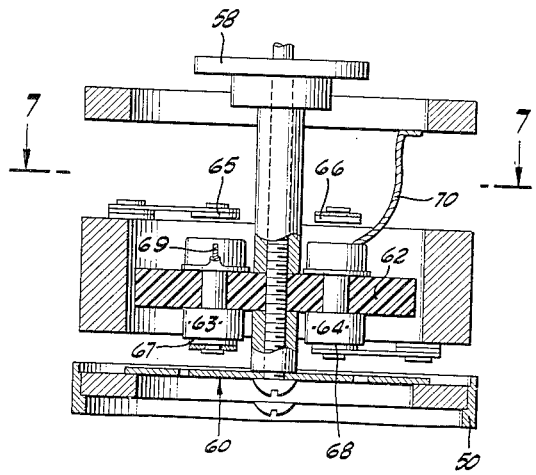
Fig. 6 is a partial view in vertical section taken substantially upon the line 6—6 upon Fig. 5.
Figure 7:
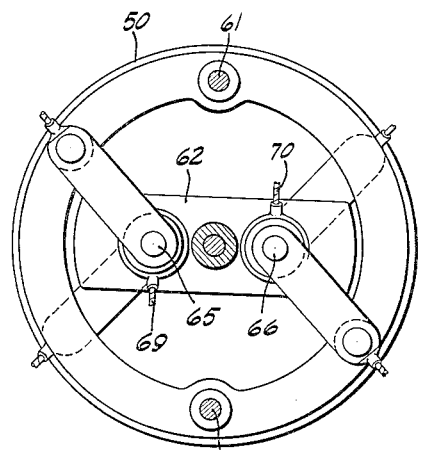
Fig. 7 is a horizontal section taken substantially upon the line 7—7 upon Fig. 6.

In the construction shown in Figs. 5, 6, and 7 there is a base 50 having prongs 51. On this base there is supported a solenoid or operating winding 52 having an axial core 53 in the bottom of which there is a central recess 54. The yoke 55 is secured centrally to the upper end of the core and extends downwardly along the sides of the winding 52 and terminates in pole faces 56 and 57 disposed adjacent to but axially spaced from the lower end of the core 53. The core and yoke as well as the armature 58 are formed of magnetizable material and function in substantially the same manner as that previously described. The armature is mounted on a stem 59 the lower end of which extends through the hub of a non-resonant spring 60. The spring 60 is of the same construction previously described having its outer ends anchored on studs 61. This spring is capable of flexing in an axial direction, that is, an up and down direction as depicted in Fig. 5 but is resistant to movements in a side to side or in a forward and backward direction as depicted in this figure. On the stem there is a section of insulation 62 carrying contact buttons or the equivalent indicated at 63 and 64. These contact buttons are adapted to engage contacts 65, 66, 67 and 68 depending upon whether the relay is energized or not and also on the type of relay employed. The contact buttons 63 and 64 are provided with flexible leads 69 and 70 connected to some of the prongs 51. The contacts 65, 66, 67 and 68, are connected to other of the prongs and the remaining two prongs 51 are connected to the operating winding 52. In this form of construction, as the buttons 63 and 64 are preferably formed of silver and have no snap-over center springs corresponding to the arch springs 40, the relay is incapable of withstanding as high accelerations and decelerations as that form of construction illustrated in Fig. 1. However, in tests it has been capable of withstanding accelerations and decelerations of 30 gravity units per ten milliseconds and has also been capable of adequately resisting malfunctioning due to vibration over frequencies from ten to fifty cycles per second through an excursion of 0.6 inches. This ability to withstand vibration is primarily due to the small mass of the stem and armature and the fact that the stem is supported at its outer end by the non-resonant spring.

From the above described constructions it will be appreciated that a relatively simple, novel relay has been developed capable of meeting very exact requirements as to vibration and acceleration and deceleration without malfunctioning.

Various changes may be made in the details of construction without departing from the spirit and scope of the invention as defined by the appended claims.

We claim:

1. A shock and vibration resistant relay comprising a solenoid having an axial core, an armature adapted to be attracted thereby when the solenoid is energized, said armature being arranged in axial alignment with the core and having one end slidably guided by said core so as to be held against lateral displacement, the other end of the armature being resiliently supported by a substantially flat spiral spring which holds that end of the armature against lateral displacement but permits axial movement thereof, said spring having a plurality of arms which are of unequal width and which taper outwardly from a hub portion that is connected with the armature to finite end portions which are fixed to support said armature, a contactor operatively connected to the armature so as to be moved thereby, contacts engageable and disengageable by the contactor, and an arched snap-over spring exerting pressure on the contactor to urge the contactor into either of its extreme positions.

2. In a shock and vibration resistant relay, a solenoid having a central axial core, a yoke of magnetizable material connected centrally to one end of the core and extending around the sides of the solenoid terminating in pole faces at the sides of and axially spaced from the other end of the core, an armature adapted to assume a position between the pole faces against said other end of the core or a position spaced axially from said other end of the core, means guiding one end of the armature for axial movement relative to the core and holding it against lateral displacements relatively thereto, and a spring secured to the armature urging it into a position spaced axially from said other end of the core, said spring being in the form of a flat spring of uniform thickness having a central hub and two spiral arms extending outwardly therefrom by which the spring is supported, said spiral arms being of unequal widths and tapering exponentially, a contactor operatively connected to the armature, contacts engageable and disengageable thereby, and a snap-over spring bearing upon the contactor urging it into either of its extreme positions.

3. In a shock and vibration resistant relay, a solenoid having a central axial core, a yoke of magnetizable material connected centrally to one end of the core and extending around the sides of the solenoid terminating in pole faces at the sides of and axially spaced from the other end of the core, an armature adapted to assume a position between the pole faces against said other end of the core or a position spaced axially from said other end of the core, means guiding one end of the armature for axial movement relative to the core and holding it against lateral displacements relatively thereto, and a spring secured to the armature urging it into a position spaced axially from said other end of the core, said spring being in the form of a substantially flat spring having a central hub and spiral arms extending outwardly therefrom by which the spring is supported, said arms being of unequal width and tapering a contactor operatively connected to the armature, contacts engageable and disengageable thereby, and a snap-over spring bearing upon the contactor urging it into either of its extreme positions.

4. A shock and vibration resistant relay comprising a winding, a core therefor, an armature adapted to be attracted when the core is energized by the winding, means slidably guiding the armature holding it against lateral displacement relatively to the winding but permitting axial movement thereof, a spring having a hub secured to the armature and having a plurality of arms extending outwardly therefrom to finite ends that are fixed to support the armature, each of the arms having a resonance differing from that of the others and each increment of which along the length of the arms has a resonance differing from that of adjoining increments, a contactor operatively connected to the armature, contact means engageable and disengageable thereby, and a snap-over spring bearing on the contactor urging the contactor into either of its extreme positions.

5. A shock and vibration resistant relay comprising a solenoid having a core, an armature adapted to be attracted thereby when the solenoid is energized, said armature being arranged in axial alignment with the core and having one end guided thereby so that movements of the armature are restricted to a direction axially with respect to the core, the other end of the armature being resiliently supported for such axial movement by a spring having a hub secured to the armature and having a plurality of arms of finite length each of which is non-resonant with respect to the other and each of which has each increment along its length non-resonant with respect to adjacent increments, means fixedly supporting the outer ends of the arms with relation to the solenoid said spring being biased to urge the armature into one of its extreme positions, a contactor operatively connected to the armature so as to be moved thereby when the armature is moved, one or more contacts engageable thereby, and snapover spring means exerting pressure on the contactor to urge the contactor into either of its extreme positions.

6. A shock and vibration resistant relay comprising a solenoid having a core, an armature adapted to be attracted thereby when the solenoid is energized, said armature being arranged in axial alignment with the core and having one end guided thereby so that movements of the armature are restricted to a direction axially with respect to the core, the other end of the armature being resiliently supported for such axial movement by a spring having a hub secured to the armature and having a plurality of arms of finite length, said arms being of equal thickness and being of spiral form, the arms being of unequal width and tapering outwardly in accordance with an exponential taper, means for fixedly supporting the outer ends of the arms with relation to the solenoid, each arm being non-resonant with respect to the other within the frequency of vibrations to which the relay is apt to be subjected, said spring being biased to urge the armature into one of its extreme positions, a contactor operatively connected to the armature so as to be moved thereby when the armature is moved, one or more contacts engageable thereby, and snapover spring means exerting pressure on the contactor to urge the contactor into either of its extreme positions.

References Cited in the file of this patent

UNITED STATES PATENTS

| | | |
|---|---|---|
| 1,673,819 | Haas | June 19, 1928 |
| 1,700,314 | Hartwig | Jan. 29, 1929 |
| 1,932,164 | Petit | Oct. 24, 1933 |
| 1,994,574 | Critchfield | Mar. 19, 1935 |
| 2,018,479 | Zeininger | Oct. 22, 1935 |
| 2,033,410 | Dezotell | Mar. 10, 1936 |
| 2,237,705 | Kohl | Apr. 8, 1941 |
| 2,278,561 | Rady | Apr. 7, 1942 |
| 2,299,671 | White | Oct. 20, 1942 |
| 2,415,448 | Stilwell, Jr. | Feb. 11, 1947 |
| 2,487,372 | Rackley | Nov. 8, 1949 |